Dec. 29, 1959  J. E. REDNOUR  2,918,928
PROCESS AND APPARATUS FOR LIQUID TRANSFER
Filed Oct. 16, 1956
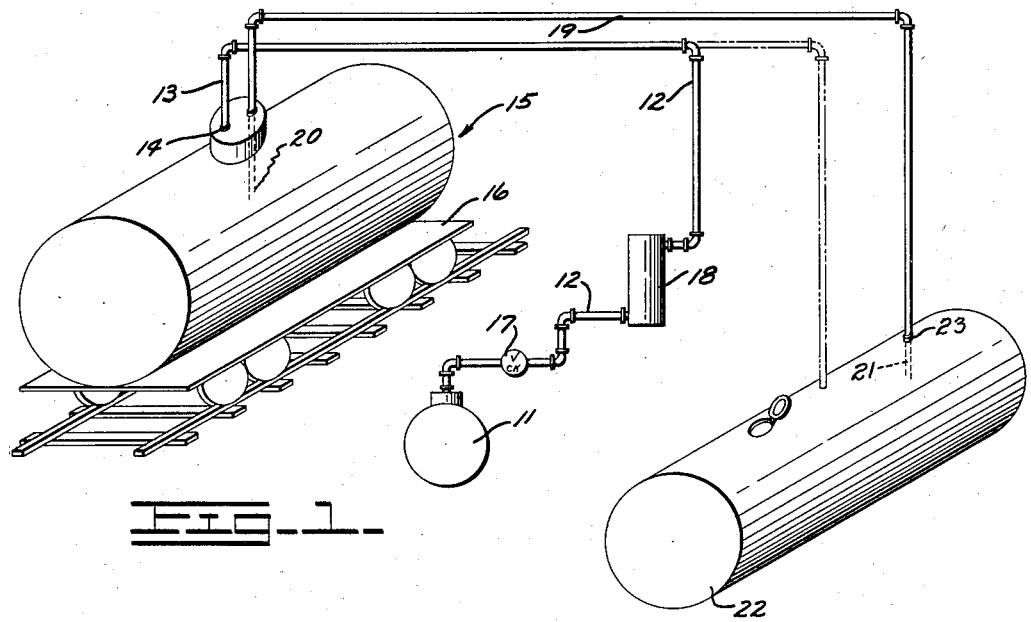
FIG-1-
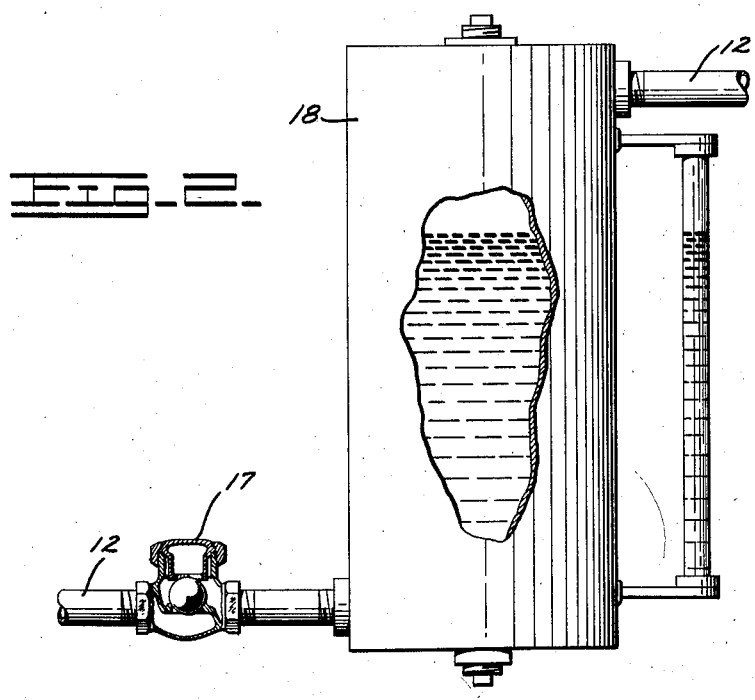
FIG-2-
INVENTOR
John E. Rednour
BY
Dean Laurence
ATTORNEY

United States Patent Office 2,918,928
Patented Dec. 29, 1959

2,918,928

PROCESS AND APPARATUS FOR LIQUID TRANSFER

John E. Rednour, Jackson, Miss.

Application October 16, 1956, Serial No. 616,284

4 Claims. (Cl. 137—14)

The present invention relates to an atmospheric circuit transfer system for corrosive liquids which present explosive, health (physiological), pressure, and thermal problems in handling. More particularly the present invention relates to an improved safe and simple system for transferring hazardous anhydrous liquids, such as liquid ammonia, from storage to commercial carrier and thence to storage wherein the storage or carrier tank is open to atmospheric pressure.

Present day known systems employ several techniques, the best known is the differential pressure technique using either compressed air or the ammonia gas per se as the pressure head media. Such systems are shown in Kirk-Othmer, Encyclopedia of Chemical Technology, volume 1, page 804 and in United States Patent 2,012,362. The present day systems are seen to be complicated piping arrangements which require constant attention and repair to the valves and other fittings because gaseous ammonia backs up and collects inside the system corroding these fittings.

It is an object of the present invention to provide a single piping arrangement and system for transferring a corrosive liquid from one point to another.

It is another object of the present invention to provide a system wherein valves, etc., are not subjected to the corrosive action of the liquid or gas.

It is a further object of the present invention to provide a transfer system wherein standard and relatively inexpensive compressors and standard piping can be employed without fear of explosion, corrosion, and damage due to ammonia contact with compressor equipment.

In the drawing:

Figure 1 is a schematic perspective view showing a storage tank in the form of a tank car and illustrating the apparatus and process of the present invention for accomplishing transfer of the liquid contents of the storage tank to another tank or use and illustrating in phantom-line the simplicity of reversing the flow as desired.

Figure 2 is a side elevation view of the check valve and oil seal located in the discharge line from the compressor to assure prevention of liquid back-up to the compressor. In this figure portions of the oil tank and the check valve are cut away to reveal constructional details.

*General description*

The present invention, a system for transferring hazardous liquids, comprises a source of compressed gas chemically relatively inert to ammonia, such as air, a line for carrying the compressed gas, a check valve in said line, and an oil filled trap adjacent the check valve, a liquid line and a pair of tanks one of which contains the liquid to be transferred. It will be understood that the tank to which the ammonia is ultimately transferred is at atmospheric conditions. In some instances the end tank will be an open mixing tank as used in fertilizer preparation. The gas line is of such a length as to permit connection to a point in a liquid container such as will establish a pressure head above said liquid. The discharge line is positioned within the container containing the liquid so that its one end is near or at the bottom of the container and its other end connected to a second or empty container. A system has thus been provided for transferring a corrosive liquid from one container to another using minimum piping and fittings and having each fitting protected from contact with any corrosive action of the liquid or gases therefrom.

*Specific description*

The transfer system of the present invention as shown in the accompanying drawing comprises a compressor 11 as the source of compressed gas. An air line 12 is connected to the pressure side of the compressor 11. The air line 12 is of such length as to permit connection of its free end 13 to a fitting 14 on a tank 15 such as tank car 16. The tank car fitting 14 is the fitting which merely enters the top of the tank thus providing a means for establishing a pressure head above the liquid in the tank. In the air line 12, adjacent the compressor 11 is a check valve 17. The check valve 17, shown as a ball check valve, permits air to travel from the compressor to the air line end 13 but not in a reverse direction. While the check valve has been shown as a ball check other check valves such as a swinging gate type are satisfactory. Adjacent the check valve 17 and downstream therefrom is a trap 18 preferably filled with oil. The purpose of trap 18 is two-fold. Firstly, it separates residual water from the air, and, secondly, it acts as a primary barrier against back-up of ammonia either as a gas or liquid to the compressor 11. A liquid transfer line 19 is connected to the tank 15 so that its lower end 20 is near the bottom of the tank 15. The liquid line 19 is provided of a length such that its other end 21 connects to a second tank such as a storage tank 22 which is open to the atmosphere.

As suggested in Figure 1 a reversal of flow from tank 22 to tank 15 is simply accomplished by closing the opening to the atmosphere on tank 22, opening tank 15 to the atmosphere and reversing the placement of pipes 12 and 13 as shown in phantom-line.

Thus, there has been provided a simple piping system wherein no fitting such as a valve or the compressor is subjected to even the remote possibility of contact with the corrosive liquid or gas. The compressor line is free from contact with any liquid and only by an osmotic-like action can the corrosive gas back up in the air line. Even though this occurs the compressor is protected by two members, the first an oil trap 18 and then the check valve 17.

*Operation*

In operating the system of the present invention the air line 12 is connected at end 13 to fitting 14 of tank 15 of tank car 16 so that the air introduced into the tank 15 will create a pressure head above the liquid in the tank 15. The air passes through check valve 17 and then in oil trap 18 wherein any water will be separated from the air as it passes through the oil head. The transfer line 19 is connected to tank 15 so that its end or an interior pre-built connection 20' is near the bottom of the tank 15. The other end 21 of transfer line 19 is connected to the inlet valve 23 of the tank 22. The compressor 11 is started and pressure applied to the tank 15 through fitting 14. The liquid is driven out of the tank 15 through end 20 of transfer line 19 and into storage tank 22. As long as a pressure head is maintained above the liquid in tank 15 liquid will be transferred to the storage tank 22 through line 19. It is self-evident that no liquid can enter air line 12 and further self-evident that no gas can back up to the compressor 11.

Having thus described my process and apparatus for transfer of liquid material, and more particularly am- monia, it will be appreciated that modifications within the ordinary skill of the art are intended to be included in the invention limited only by the scope of the hereinafter included claims.

I claim:

1. Apparatus for transfer of liquid ammonia from one receptacle to another comprising: a compressor; a discharge line from said compressor; a check valve in said discharge line operating against back up; an oil trap downstream from said check valve in said discharge line and through which the discharge moves; a connection of said discharge line to one receptacle charged with ammonia; a conduit having an opening below the liquid level of said receptacle through which liquid flows upon application of pressure; and a delivery end of said conduit emptying into a second receptacle.

2. A corrosive liquid transfer system for transferring liquid from a container to a receptacle comprising: a source of compressed gas chemically relatively inactive with ammonia; a gas line extending from said source to contain and direct a flow of compressed gas to develop a pressure head in a container above a liquid in said container, said liquid being ammonia; an oil-filled trap in said gas line downstream from said source; a one-way check valve in said gas line between said source and said oil-filled trap and permitting flow only in the direction from said source to said oil-filled trap; a liquid transfer line extending into said container and having one open end positioned at the lowest level of liquid desired to be established in said container, said liquid transfer line having its other end opening into a receptacle to deliver liquid to said receptacle.

3. A corrosive liquid transfer system for transferring corrosive liquid from a container to a receptacle comprising: a compressor for compressing air; an air line extending from said compressor to contain and direct a flow of compressed air to develop a pressure head in a container above a liquid in said container, said liquid being ammonia; an oil-filled trap in said gas line downstream from said compressor; a vertical transparent sight glass mounted adjacent the oil-filled trap and communicating therewith; a one-way check valve in said air line between said compressor and said oil-filled trap and permitting flow only in the direction from said compressor to said oil-filled trap; a liquid transfer line extending into said container and having one open end positioned at the lowest level of liquid desired to be established in said container, said liquid transfer line having its other end opening into a receptacle to deliver liquid to said receptacle.

4. A process for transferring liquid ammonia from a container to a receptacle comprising the steps: compressing an inert gas chemically relatively inactive with ammonia; passing said compressed inert gas through a one-way check valve; thereafter passing said compressed inert gas through an oil-filled trap; thereafter passing said compressed inert gas through a line to the space within a container above a volatile corrosive liquid in said container; flowing the volatile corrosive liquid under the pressure of said compressed inert gas from said container into a receptacle.

References Cited in the file of this patent

UNITED STATES PATENTS

| | | |
|---|---|---|
| 281,963 | Brady | July 24, 1883 |
| 1,097,470 | Rolland | May 19, 1914 |
| 2,155,943 | Kittredge | Apr. 25, 1939 |
| 2,379,215 | Brinkmann | June 26, 1945 |
| 2,502,525 | Krugler | Apr. 4, 1950 |